H. K. HITCHCOCK.

MECHANISM FOR FEEDING GLASS.

APPLICATION FILED OCT. 1, 1913.

Reissued June 15, 1915.

13,929.

2 SHEETS—SHEET 1.

WITNESSES:

Paul M. Critchlow

Francis J. Tomanow.

INVENTOR

Halbert K. Hitchcock by Christy & Christy

Atty's

H. K. HITCHCOCK.

MECHANISM FOR FEEDING GLASS.

APPLICATION FILED OCT. 1, 1913.

Reissued June 15, 1915.

13,929.

2 SHEETS—SHEET 2.

WITNESSES:

Paul M. Critchlow

Francis J. McManus

INVENTOR

Halbert K. Hitchcock by Christy & Christy

Attys.

UNITED STATES PATENT OFFICE.

HALBERT K. HITCHCOCK, OF TARENTUM, PENNSYLVANIA, ASSIGNOR OF ONE-HALF TO HITCHCOCK EXPERIMENT COMPANY, A CORPORATION OF NEW JERSEY.

MECHANISM FOR FEEDING GLASS.

13,929. Specification of Reissued Letters Patent. Reissued June 15, 1915.

Original No. 805,067, dated November 21, 1905, Serial No. 212,353. Application for reissue filed October 1, 1913. Serial No. 792,876.

*To all whom it may concern:*

Be it known that I, HALBERT K. HITCHCOCK, a citizen of the United States, residing at Tarentum, in the county of Allegheny and State of Pennsylvania, have invented or discovered certain new and useful Improvements in Mechanism for Feeding Glass, of which improvement the following is a specification.

The invention described herein relates to certain improvements in the feeding of glass from a tank, furnace, or other suitable reservoir to molds or other shaping devices, and has for its object a construction whereby it is possible to avoid the formation of solid or partially solidified portions of glass at the discharge orifice during any interruption of the feed of the glass from the tank or containing vessel.

The invention is hereinafter more fully described and claimed.

Figure 2:
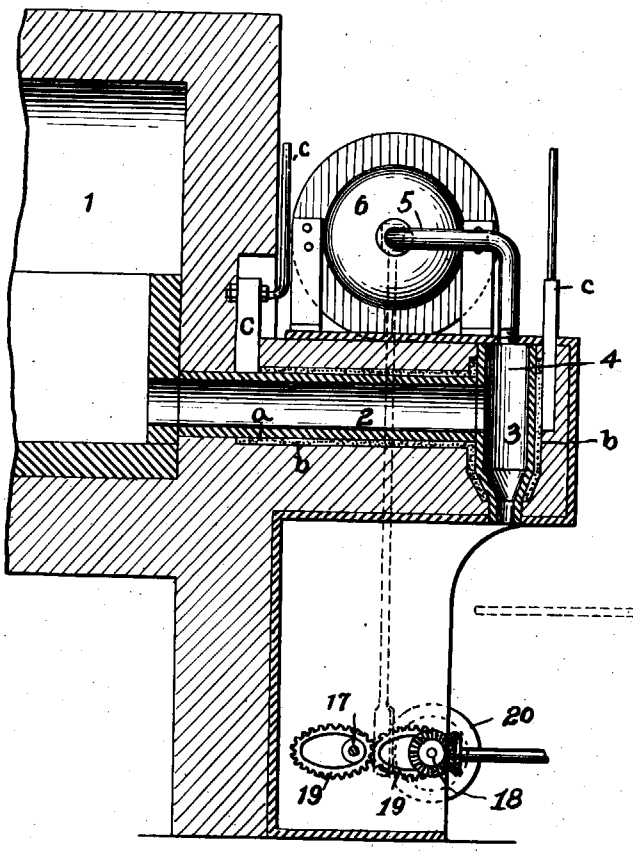
Figure 1:
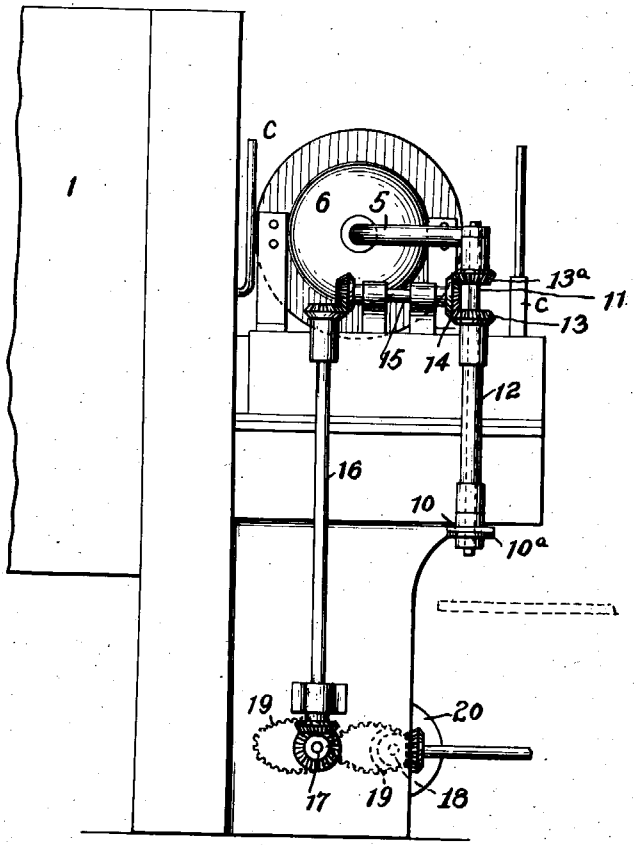
Figure 4:
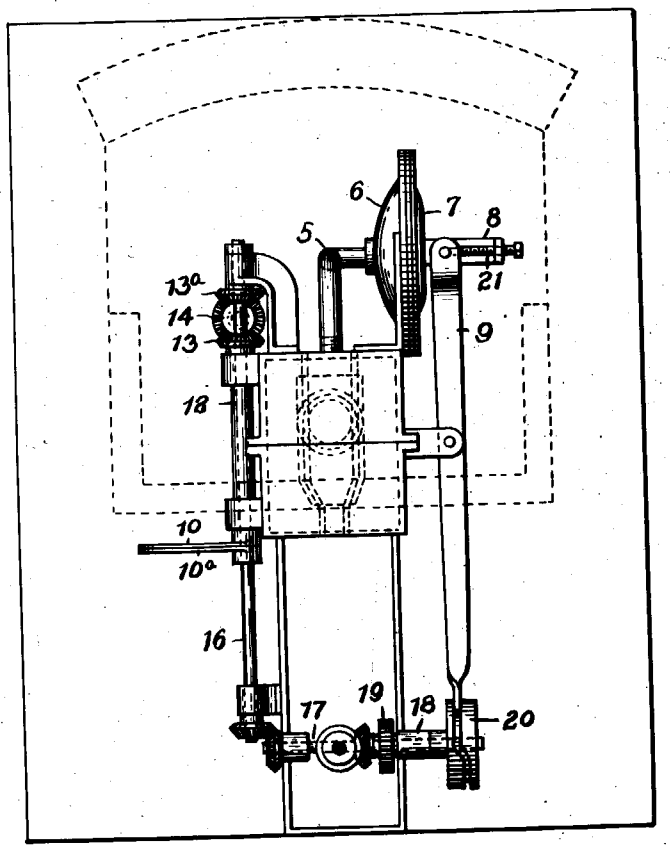
Figure 3:
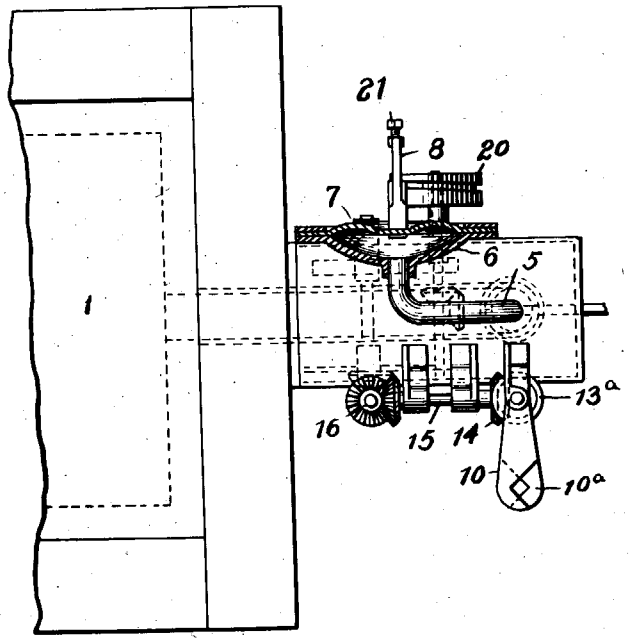

In the accompanying drawings, forming a part of this specification, Figure 1 is a side elevation of a portion of a furnace having my improved feed mechanism applied thereto. Fig. 2 is a sectional elevation of the same, and Fig. 3 is a top plan view, a portion of the exhaust apparatus being shown in section, and Fig. 4 is an end elevation.

In the practice of my invention my improvements are applied to any suitable form or construction of tank-furnace 1 or other receptacle in which sufficient heat may be maintained to keep the glass in the desired condition of plasticity. From this tank or vessel extends an open passage 2, communicating at its outer end with a transverse and preferably vertical passage 3, having its discharge outlet at its lower end and having at its upper end a vacuum or displacement chamber 4, connected by pipe 5 to a suitable exhaust device whose operation can be readily controlled. The tank 1 is made sufficiently tight to permit of the formation of a more or less complete vacuum therein and in passage 2 and chamber 3 communicating therewith, or the glass could be maintained in the tank 1 at a level above the passage 2, so that a vacuum can be produced in chamber 4 only. A desirable form or construction of such exhaust device consists of a concavo-convex metal shell 6, to the edges of which is secured a flexible diaphragm 7. This diaphragm is connected, preferably at its central point, to an arm 8, which in turn is connected to one end of a lever 9, whereby to shift the diaphragm in and out, thereby creating and destroying a partial vacuum in the chamber 4 and the passages 2 and 3 connected thereto. As will be readily understood by those skilled in the art, if, while the glass is flowing freely through the passages 2 and 3 from the outlet, diaphragm 7 should be drawn suddenly outward, a certain vacuum will be produced, so that atmospheric pressure acting on the glass in the passage 3 will force the glass backwardly into said passage and chamber 4, the walls of which are heated by any suitable means.

A desirable construction for maintaining the passages 2 and 3 at a temperature at least equal to that of molten glass is clearly shown in Fig. 2. The passages are lined with a highly refractory material, as carborundum, and this lining *a* is surrounded by granulated carbon *b*, which is electrically connected to terminals *c* and they in turn to a suitable generator.

In feeding the glass into a mold or other receptacle suitable means are provided whereby when a sufficient quantity has been placed in the mold and the connected strand severed, the direction of movement of glass at the discharge orifice may be reversed, so that the glass between the orifice and the shears at the time of their operation may be drawn back and its plasticity restored in the passage. A suitable construction for severing this connecting strand of glass consists of two shear-blades 10 and 10ª, one of which is secured to a shaft 11 and the other to a sleeve 12, surrounding the shaft. These blades are secured in such angular relation to each other on the shaft that when rotating they will pass each other at diametrically opposite points, one of the points corresponding to or lying in the axis of the passage 3 from which the glass exudes. The sleeve and shaft are rotated in opposite directions by any suitable means—such, for example, as that shown, consisting of two beveled gears 13 and 13ª mounted, respectively, on the sleeve and shaft and engaging a corresponding pinion 14 on a counter-shaft 15. This shaft is driven by vertical shaft 16, and it in turn by shaft 17 through suitable interposed gearing. As it is desired that the shear-blades should have a quick movement at the time of severing the glass while at other times they may have a slower movement, the shaft 17 is driven from the shaft 18 by means of elliptical gearing 19, as shown.

When feeding the glass to molds where the latter are presented or brought into line with the outlet from the furnace or chamber at regular predetermined intervals, it is preferred that the operation of the exhaust mechanism should occur at similar equal predetermined intervals and immediately subsequent upon the operation of the shear-blades. To this end, a cam 20 on the power shaft 18 is employed to operate the lever 9. As the operation of the shear-blades is effected from the power-shaft, it follows that by a suitable adjustment of the mechanism described the shearing operation and the drawing up of the glass into the feed-passage can be made to occur in any desired order and at any desired time. The movement of the diaphragm can be regulated in any suitable manner, as, for example, by means of the screw 21, as shown in Fig. 4.

The invention described herein is not limited as regards the broad terms of the claims to any particular construction or arrangement of mechanical devices whereby a vacuum higher or lower is applied to the glass flowing from the furnace, so as to arrest such normal flow and to pull back any glass which may have exuded from the discharge outlet.

It is characteristic of the invention described herein that the feed of the glass can be controlled—*i. e.*, decreased or reversed—by varying the atmospheric pressure on the glass before it escapes from the outlet, and hence it is immaterial except as regards constructing and operating the controlling mechanism on what portion of the surface of the glass—*i. e.*, within the tank or the passage leading therefrom—the pressure is varied.

I claim herein as my invention:

1. A glass-feeding mechanism having in combination, a chamber or receptacle having an outlet for the gravity flow of the glass, and means for reducing the pressure below atmospheric pressure on some portion of the glass prior to its escape from the outlet, thereby varying the gravity flow or feed, substantially as set forth.

2. A glass-feeding mechanism having in combination, a chamber or receptacle having an outlet, means for alternately decreasing and increasing the pressure on the glass at some point in its flow to the outlet, and mechanism operatively connected to the pressure controlling means for interrupting the continuity of the stream of glass exuding from the outlet, substantially as set forth.

3. A glass-feeding mechanism having in combination, a chamber or receptacle having an outlet for the gravity flow of glass, means for severing the glass after its passage from the outlet and means for reversing the movement of the glass above the plane of severance, substantially as set forth.

4. A glass-feeding mechanism having in combination, a glass-containing or supply chamber having an outlet for the gravity flow of glass, means for severing the glass below the outlet and means for causing the glass above the plane of severance to flow back through the orifice, substantially as set forth.

5. A glass-feeding mechanism having in combination, a furnace for producing molten glass, a displacement chamber, a passageway offering equal resistance to the flow of glass in either direction directly connecting said furnace and said displacement chamber, a discharge orifice in the lower part of said displacement chamber, and means for varying the fluid pressure in said displacement chamber.

6. A glass-feeding mechanism having in combination, a receptacle for molten glass, a displacement chamber, an open passageway connecting said receptacle and said displacement chamber, a discharge orifice below the top of said displacement chamber, and means for creating a vacuum in said displacement chamber above the discharge orifice.

7. A glass-feeding mechanism having in combination, a furnace for producing molten glass, a displacement chamber connected thereto by a passageway capable of allowing the glass to flow therethrough in either direction, a discharge orifice leading from the displacement chamber below its top, and a means of varying the volume of glass in the displacement chamber above the discharge orifice without cutting off the connection between the furnace and displacement chamber.

8. A glass-feeding mechanism having in combination, a furnace for producing molten glass, a displacement chamber connected thereto by a passageway capable of allowing the glass to flow therethrough in either direction, a discharge orifice leading from the displacement chamber below the level of the glass in the furnace, and a means of varying the fluid pressure above the level of the glass in the displacement chamber.

9. A glass-feeding mechanism having in combination, a furnace for producing molten glass having a discharge passageway leading therefrom capable of allowing the glass to flow in either direction therethrough at all times, a displacement chamber located in the normal line of flow of the glass through said passage, and a means of alternately expelling the glass from the passage beyond the displacement chamber and reversing its movement thereby varying the volume of glass in the displacement chamber.

In testimony whereof I have hereunto set my hand.

HALBERT K. HITCHCOCK.

Witnesses:
E. PETERSON,
HORACE BARNES.